United States Patent [19]

Loy

[11] Patent Number: 5,944,293
[45] Date of Patent: Aug. 31, 1999

[54] BRACKET ASSEMBLY FOR PIVOTALLY CARRYING A DISPLAY SIGN

[75] Inventor: Kenneth Loy, Alliance, Ohio

[73] Assignee: Darko Company, Inc., Twinsburg, Ohio

[21] Appl. No.: 09/012,881

[22] Filed: Jan. 23, 1998

[51] Int. Cl.[6] .............................. F16M 11/00; A47B 96/06
[52] U.S. Cl. .................... 248/220.21; 248/202.1; 248/213.1; 248/222.51; 248/225.11; 248/225.21; 248/240.4
[58] Field of Search ..................... 248/300, 201, 248/202.1, 213.1, 220.21, 220.22, 222.51, 222.52, 225.11, 225.21, 240, 240.4; 16/249, 268, 293, 297, 319, 382, 231, 309, 343

[56] References Cited

U.S. PATENT DOCUMENTS

| | | | |
|---|---|---|---|
| 2,628,054 | 2/1953 | Fazakerley | 248/311.2 |
| 3,544,049 | 12/1970 | Brown | 248/300 |
| 4,013,253 | 3/1977 | Perrault et al. | 248/223.3 |
| 4,113,109 | 9/1978 | Donnelli et al. | 248/221.1 |

Primary Examiner—Derek J. Berger
Assistant Examiner—Michael Nornberg
Attorney, Agent, or Firm—Renner, Kenner, Greive, Bobak, Taylor & Weber

[57] ABSTRACT

A bracket assembly (13) includes a first bracket (19) adapted to be attached to a display fixture (10) and a second bracket (18) adapted to be attached to a sign (11, 12). The second bracket (18) includes lugs (26) positionable in a loop (31) formed in the first bracket (19) to permit both lateral and pivotal movement of the second bracket (18) relative to the first bracket (19). The second bracket (18) is also provided with an aperture (24) to selectively receive either a first hook (37) to hold the sign (11) in one position or a second hook (30) to hold the sign (12) in another position.

18 Claims, 3 Drawing Sheets

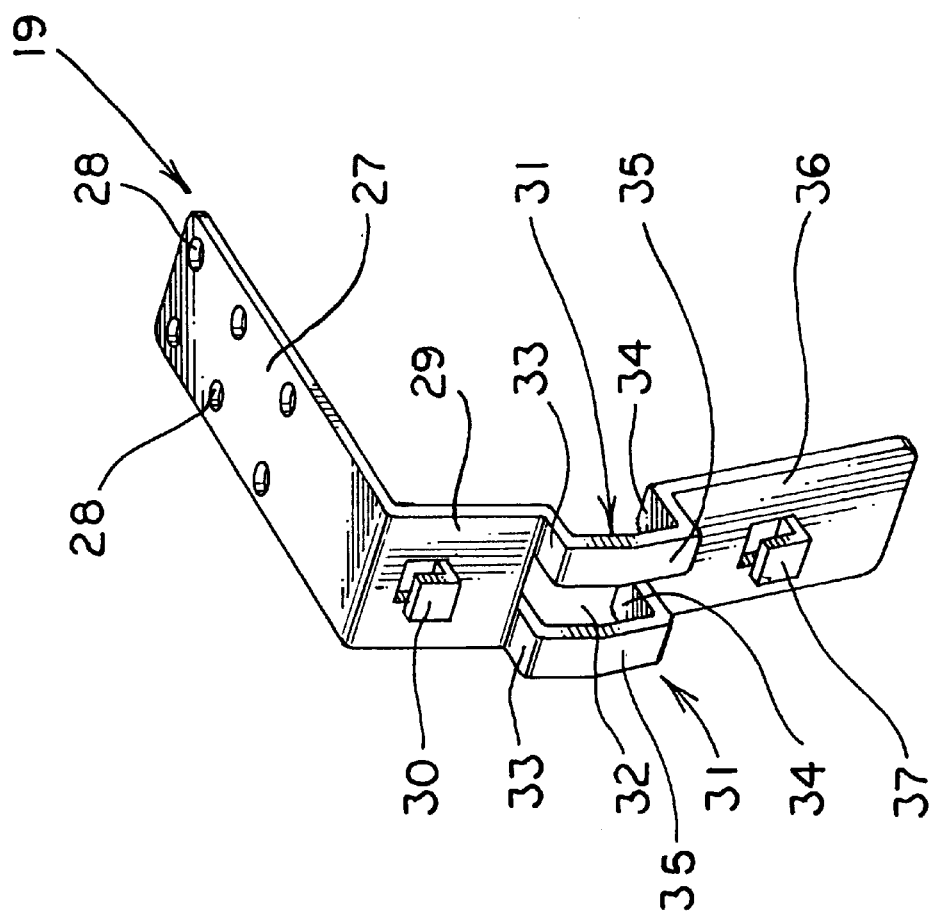
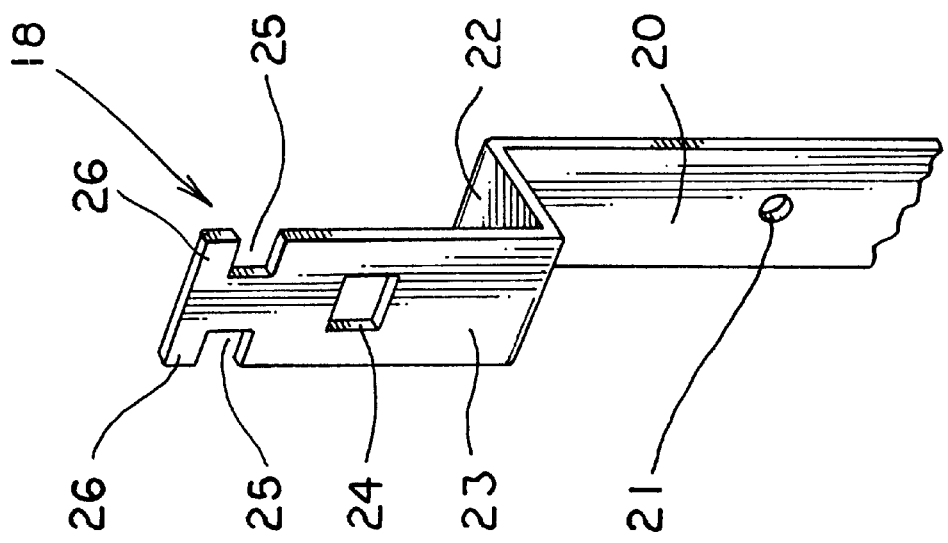
FIG. 3
FIG. 2

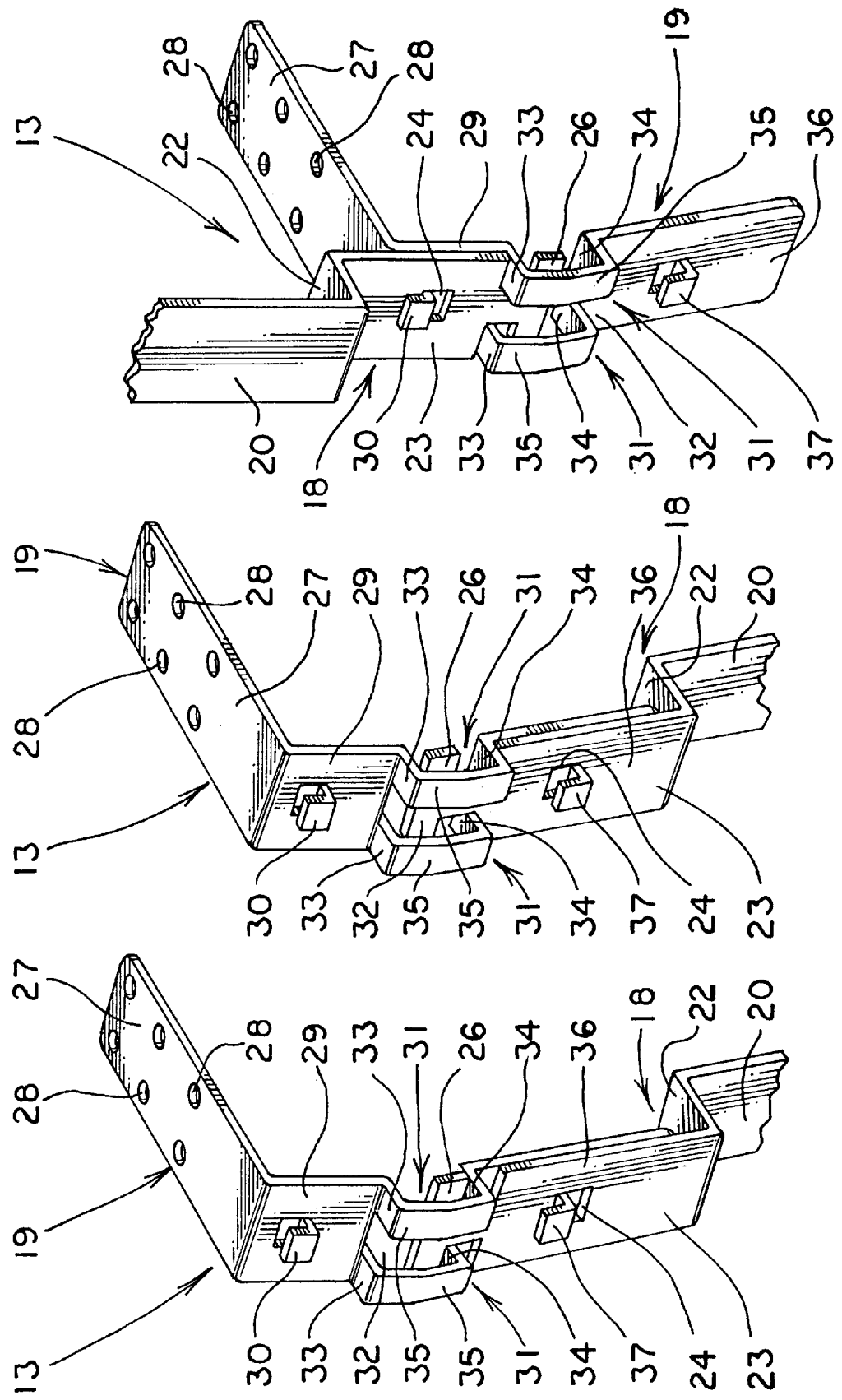

5,944,293

BRACKET ASSEMBLY FOR PIVOTALLY CARRYING A DISPLAY SIGN

TECHNICAL FIELD

This invention relates to a bracket assembly which mounts a display sign to a retail merchandising fixture. More particularly, this invention relates to such a bracket assembly which allows the sign to be pivoted from a position in use, wherein the message on the sign is visible to the consumer, to a position wherein the retailer can gain access to merchandise being stored behind the sign.

BACKGROUND ART

Most retailers of the warehouse type display their goods on tall shelving units which quite often can extend upwardly almost to the ceiling of the establishment. The lower shelves, that is, those within reach of the consumers, are stocked with merchandise being currently offered for sale, while the upper shelves are often utilized to store inventory of various goods.

It is a common practice to hang a display sign from one of these upper shelves to provide sale information and product identification for the products carried by the lower shelves. Although such a system thus permits the retailers to use all available space to display products and store inventory, while at the same time providing a sign to convey information regarding the products being displayed, the signs obstruct the retailer from access to the inventory behind them. Thus, when inventory is to be removed from or added to these upper shelves, the signs must be temporarily removed and then replaced, which is a time consuming project for the retailer.

Thus, the need exists for a system of mounting a sign to a retail display fixture whereby the sign can be readily moved out of the way of products which are being stored behind it.

DISCLOSURE OF THE INVENTION

It is thus an object of the present invention to provide a system for attaching a sign to a retail display fixture.

It is another object of the present invention to provide a system, as above, in which the sign may be pivoted from a position in use to a position wherein the retailer can gain access to items carried by the fixture behind the sign.

It is a further object of the present invention to provide a system, as above, in which the sign can be readily locked in both positions.

It is yet another object of the present invention to provide a system, as above, in which the sign may be readily removed from the fixture and another sign substituted therefor.

It is an additional object of the present invention to provide a system, as above, which is easy to assemble and inexpensive to manufacture.

These and other objects of the present invention, as well as the advantages thereof over existing prior art forms, which will become apparent from the description to follow, are accomplished by the improvements hereinafter described and claimed.

In general, an apparatus for attaching a sign to a display fixture made in accordance with the present invention includes a first bracket adapted to be attached to the fixture and a second bracket adapted to carry the sign. The second bracket is attached to the first bracket so as to allow movement of the second bracket from a first position to a second position relative to the first bracket. Means are provided to hold the brackets in the first and second positions.

A preferred exemplary system incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is a fragmented perspective view of one bracket of the system of the present invention.

FIG. 3 is a perspective view of the other bracket of the system of the present invention.

FIG. 4 is a fragmented perspective view of the brackets of FIGS. 2 and 3 engaged and locked together to hold the sign in the first position.

FIG. 5 is a fragmented perspective view similar to FIG. 4 but showing the brackets moved relative to each other to unlock them and enable them to be rotated relative to each other.

FIG. 6 is a fragmented perspective view showing the brackets having been rotated to and locked in the second position.

PREFERRED EMBODIMENT FOR CARRYING OUT THE INVENTION

Figure 1:
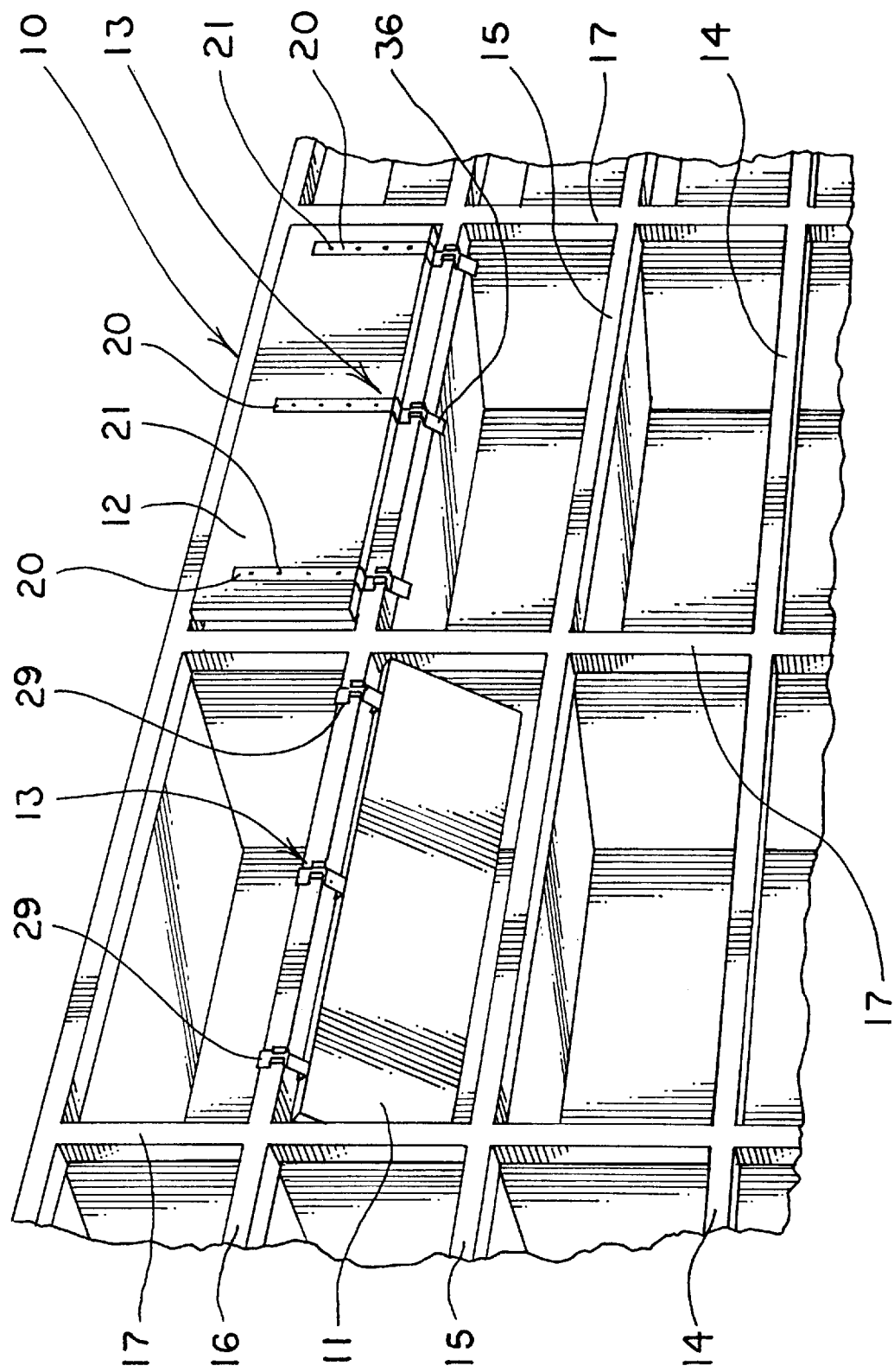
FIG. 1 is a somewhat schematic, fragmented, perspective view of a retail display shelving fixture showing two signs being carried by the system of the present invention, one sign being in a first position whereby the message carried thereby is visible to the consumer and the other sign having been rotated to a second position to permit access to the shelf originally behind the sign.

FIG. 1 shows a retail display fixture, generally indicated by the numeral 10, having signs 11 and 12 attached thereto by a bracket assembly made in accordance with the concepts of the present invention and generally indicated by the numeral 13. Fixture 10 is shown in the form of a shelving unit having horizontal shelves 14, 15, and 16 supported by, and divided into compartments by, vertical supports 17. Display units such as fixture 10 are typically provided in a retail establishment, and often extend upwardly to near the ceiling thereof. As such, items that are on the lower shelves, for example, shelf 14 and those lower (not shown) are utilized to display goods being offered for sale, and the upper shelves, such as shelves 15 and 16, are out of the reach of the consumer but are used by the retailer to store inventory of goods.

The areas of upper shelves 15 and 16 are convenient areas to position signs, such as signs 11 and 12, to advertise or otherwise identify the goods being carried on the lower shelves, such as shelf 14. Sign 11 is shown as being in use for that purpose and is being supported by bracket assembly 13. As will hereinafter be described, it should be noted that sign 11, in this position, is not supported vertically but rather, because it is usually well above the eye level of the consumer, it is tilted back, from top to bottom, so that the information on sign 11 can be readily observed. When the retailer needs access to shelf 15 to either place inventory items thereon, or remove them therefrom, sign 11 may be rotated upwardly and locked above shelf 16, sign 12 being shown in that position. Such is accomplished by bracket assembly 13 now to be described in detail.

Signs 11 and 12 are preferably attached to fixture 10 by a plurality of identical bracket assemblies 13. Each bracket assembly 13 includes two bracket portions generally indicated by the numerals 18 and 19. Bracket portion 18 is shown in FIG. 2 and includes an arm 20 preferably having a plurality of apertures 21 (one shown) therein. As shown in FIG. 1, arm 20 is an elongate member and is adapted to be attached to the back of a sign 11, 12 by means of fasteners (not shown) extending through aperture 21. Preferably each arm 20 extends substantially along the entire height of signs 11 and 12.

The top (as viewed in FIG. 2) of each arm 20 of each bracket portion 18 is provided with a ledge 22 extending forwardly therefrom which is thus over sign 11 (and under sign 12). The end of ledge 22 opposite to its end connected to arm 20 turns upwardly (as viewed in FIG. 2) thereby forming a plate 23 having a generally rectangular aperture 24 formed therein. Opposed slots 25 are formed near the end of plate 23 opposite to ledge 22 thereby forming opposed lugs 26.

Bracket portion 19 of each bracket assembly 13 is best shown in FIG. 3 and includes an arm 27 preferably having a plurality of apertures 28 formed therein. Arm 27 is thus adapted to be attached to fixture 10, in particular, to a shelf such as shelf 16 thereof, as shown in FIG. 1, by means of suitable fasteners (not shown) extending through apertures 28. A mounting plate 29 extends generally vertically downwardly from one end of arm 27 and an L-shaped hook 30 extends outwardly therefrom. Two loops, generally indicated by the numeral 31, extend downwardly from the bottom of plate 29 and are spaced, as at 32. Each loop 31 includes a generally flat upper surface 33, a generally flat lower surface 34, and a somewhat bowed central surface 35 extending between surfaces 33 and 34. A mounting plate 36 extends downwardly, preferably angled rearwardly from vertical, from the end of lower surface 34. Plate 36 is provided with an L-shaped hook 37 extending outwardly therefrom.

With a sign 11, 12, mounted to a plurality of bracket portions 18 (three shown in FIG. 1), with a like plurality of bracket portions 19 attached to fixture 10, and with the spaces between bracket portions 18 and 19 being identical, bracket portions 18 and 19 may then be assembled to form bracket assembly 13 in a manner now to be described. With bracket portion 18 tilted slightly relative to bracket portion 19, one of the lugs 26 thereof is inserted through the space 32 between loops 31 until the top of bracket portion 18 is behind central surface 35 of loops 31 of bracket portion 19, as shown in FIGS. 4–6. In this position, slots 25 are located adjacent to lower surfaces 34. Hook 37 of bracket portion 19 is positioned through aperture 24 of bracket portion 18 and, as such, the sign, such as sign 11, will hang downwardly and by its own weight be locked in place, as shown in FIG. 4. Because of the angle of plate 36, sign 11 will be slightly tilted from vertical, as previously described.

When it is desired to move the sign from the position of sign 11 to the position of sign 12, the sign is merely lifted slightly. Such movement shifts bracket portion 18 laterally relative to bracket portion 19 thereby raising aperture 24 of bracket portion 18 relative to hook 37 of bracket portion 19, and placing bracket assembly 13 in an unlocked position, a position shown in FIG. 5. From this position, bracket portion 18 may be rotated approximately 180 degrees relative to bracket portion 19. In so doing, hook 37 passes through aperture 24 and bracket portion 18 is effectively rotated on an axis generally defined by lugs 26. Upon reaching its furthest upward point, that is, when plate 23 of bracket portion 18 is adjacent to plate 29 of bracket portion 19, hook 30 has passed through aperture 24. At this time, merely releasing the sign allows it to drop slightly downwardly so that hook 30 is engaging plate 23, as shown in FIG. 6, and the sign is locked in the position of sign 12. In this position, slots 25 are located adjacent to upper surfaces 33. Of course, to return the sign to the display position, it need only be lifted from the FIG. 6 position, rotated back to the FIG. 5 position, and lowered to the FIG. 4 position. In the event that it is desired to remove the sign from fixture 10, as, for example, when desiring to change signs when in the FIG. 5 position, bracket portion 18 need only be tilted slightly relative to bracket portion 19 and lugs 26 can thereby be threaded through the space 32 between loops 31.

It should be evident that bracket assembly 13 would similarly operate if the position of the various members were reversed. For example, bracket portion 18 could be provided with a hook, and bracket portion 19 could be provided with apertures to accomplish the same result.

In view of the foregoing, it should be apparent that a device made in accordance with the present invention, as herein described, accomplishes the objects of the present invention and otherwise substantially improves the retail display art.

What is claimed is:

1. Apparatus for attaching a sign to a display fixture comprising a first bracket adapted to be attached to the fixture, a second bracket adapted to carry the sign, means to attach said second bracket to said first bracket so as to allow movement of said second bracket from a first position to a second position relative to said first bracket, an aperture in one of said brackets, a first hook on the other of said brackets receivable in said aperture to hold said brackets in said first position, and a second hook on the other of said brackets receivable in said aperture to hold said brackets in said second position after said means to attach has allowed relative movement of said first and second brackets.

2. Apparatus according to claim 1 wherein said means to attach permits pivotal movement of said first bracket relative to said second bracket.

3. Apparatus according to claim 2 wherein said means to attach also permits lateral movement of said first bracket relative to said second bracket.

4. Apparatus according to claim 3 wherein said means to attach includes spaced loops formed in one of said brackets and lugs formed in the other of said brackets.

5. Apparatus according to claim 4 wherein said loops include an upper surface and a lower surface, said lugs being movable laterally between said upper and lower surfaces.

6. Apparatus according to claim 5 wherein said lugs are formed adjacent to opposed slots, said upper and lower surfaces being receivable in said slots.

7. Apparatus according to claim 1 wherein said first bracket includes an arm adapted to be attached to the fixture.

8. Apparatus according to claim 7 wherein said first bracket includes a plate at the end of said arm, said first hook being formed on said plate.

9. Apparatus according to claim 8 wherein said first bracket includes a second plate, said second hook being formed on said second plate.

10. Apparatus for attaching a sign to a display fixture comprising a first bracket having an arm adapted to be attached to the fixture, said first bracket including a first plate at the end of said arm and a second plate, a second bracket adapted to carry the sign, means to attach said second bracket to said first bracket so as to allow movement of said second bracket from a first position to a second position relative to said first bracket, said means to attach including a loop formed between said first plate and said second plate, and means to hold said brackets in said first and second positions, said means to hold including a first hook formed on said first plate and a second hook formed on said second plate.

11. Apparatus according to claim 1 wherein said second bracket includes an arm adapted to be attached to the sign.

12. Apparatus according to claim 11 wherein said second bracket includes a plate, said aperture being formed in said plate.

13. Apparatus according to claim 12 wherein said first bracket includes a plate, said first hook being formed on said plate.

14. Apparatus for attaching a sign to a display fixture comprising a first bracket adapted to be attached to the fixture, said first bracket including a first plate and a second plate, a second bracket having an arm adapted to carry the sign, said second bracket including a plate, means to attach said second bracket to said first bracket so as to allow movement of said second bracket from a first position to a second position relative to said first bracket, and means to hold said brackets in said first and second positions, said means to hold including an aperture formed in said plate of said second bracket, a hook formed on said first plate and adapted to engage said aperture, and a second hook formed on said second plate.

15. Apparatus according to claim 12 wherein said means to attach includes lugs formed by slots formed in said plate.

16. Apparatus according to claim 15 wherein said means to attach includes a loop formed in said first bracket.

17. Apparatus according to claim 16 wherein said loop includes an upper surface and a lower surface, said lugs being movable laterally between said upper and lower surfaces.

18. Apparatus according to claim 17 wherein said upper and lower surfaces are selectively received within said slots.

* * * * *